C. POOL.
GATE.

No. 189,573. Patented April 17, 1877.

WITNESSES:

INVENTOR:
Cyrus Pool.
PER
H. J. Abbot.
ATTORNEY.

UNITED STATES PATENT OFFICE.

CYRUS POOL, OF OTTAWA, ILLINOIS.

IMPROVEMENT IN GATES.

Specification forming part of Letters Patent No. 189,573, dated April 17, 1877; application filed January 29, 1877.

*To all whom it may concern:*

Be it known that I, CYRUS POOL, of Ottawa, in the county of La Salle and State of Illinois, have invented certain new and useful Improvements in Gates; and I do hereby declare that the following is a full, clear, and exact description thereof, which will enable others skilled in the art to which it appertains to make and use the same.

My invention relates to that class of gates which are opened and closed by throwing the upper back end of the gate to one side and back of its normal position, by means of a peculiar hinge, levers, and connecting-rods, as will be hereinafter more fully set forth.

Figure 1:
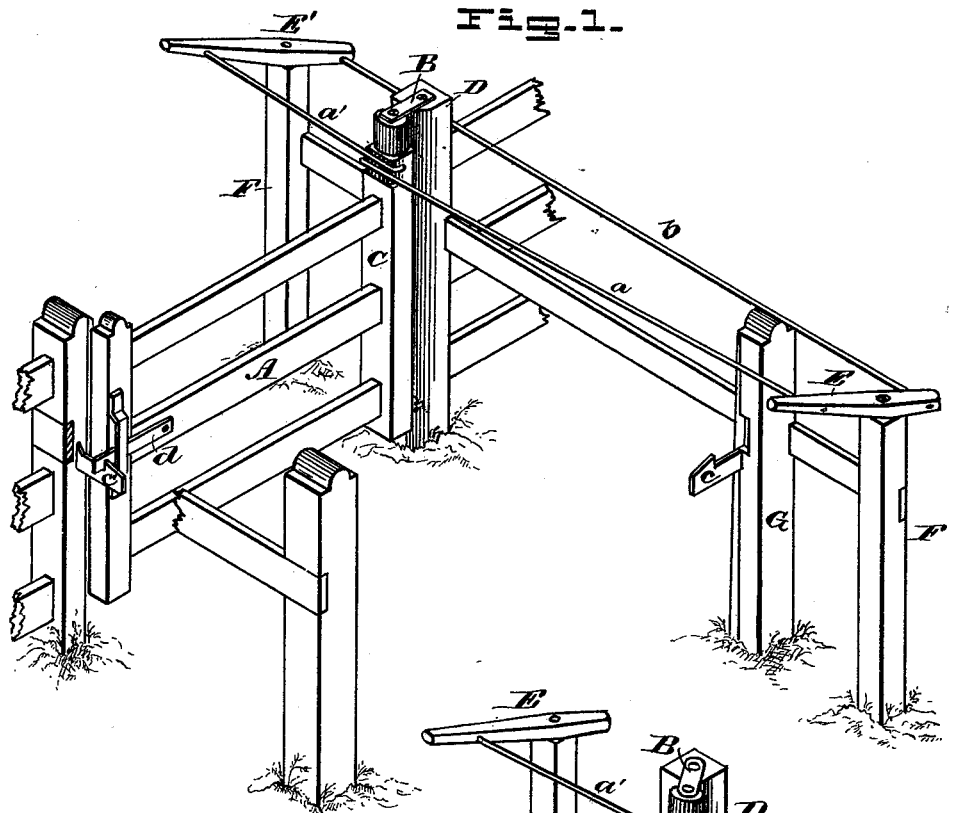
Figure 2:
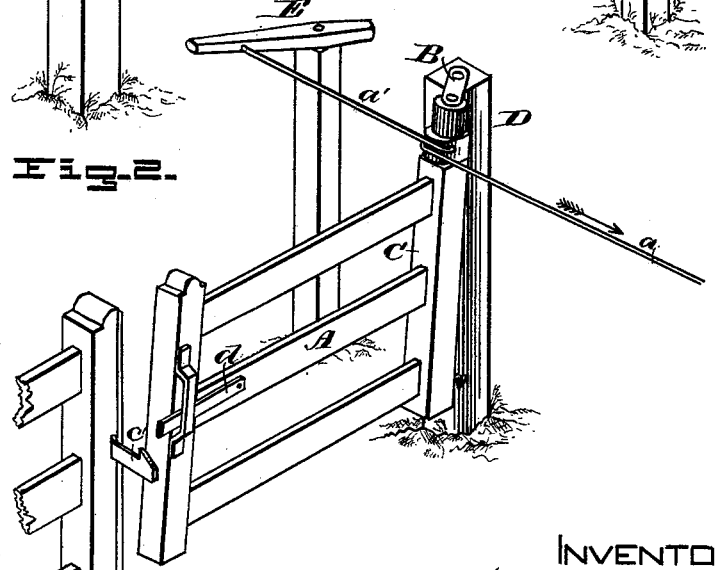

In the drawing illustrating my invention, Figure 1 is a perspective view, showing the gate closed; and Fig. 2 is a view showing the gate in a position when being opened.

A represents an ordinary farm-gate, provided with what I denominate a "double hinge," B, having one end pivoted to the top of the hinge-post C, and the other end pivoted to the gate-post D. E and E' are levers, fulcrumed or otherwise attached to a post, F, and provided with wires $a$ $a'$, each running to the far side (from its lever) of the hinge-post C, and a wire, $b$, running from lever to lever, as shown. $c$ $c'$ are catches for holding the latch $d$, and G a post for holding the gate when open.

The operation or mode of opening and closing the gate is as follows: To open the gate the lever E is moved backward, which throws the top of the hinge-post to one side and back of its normal position, (see Fig. 2,) whereby the front of the gate is elevated until the latch-bolt can pass free of its catch; then, by continuing to move the lever, the gate, in resuming its vertical position, is "thrown," and the latch-bolt engages with the catch $c$, for holding the gate open.

To close the gate the lever E' is pulled, thereby throwing the top of the hinge-post back, and elevating the front of the gate enough to allow the latch-bolt to pass free of the catch $c$, and by continuing to move the lever, the gate is thrown around until its latch-bolt engages with the catch $c'$ for keeping it closed.

By attaching the wires $a$ $a'$ to the far side of the hinge-post, as shown in Figs. 1 and 2, I find that the gate can be more easily operated in a strong wind than if attached to the double hinge B.

Having thus fully described my invention, what I claim is—

1. The levers E and E', provided with the wires $a$ $a'$, each one running to the far side of the hinge-post C, and the wire $b$, attached to the levers, as shown, and for the purpose set forth.

2. The combination, with an ordinary gate, of the levers E E', wires $a$ $a'$ $b$, double hinge B, post G, and catches $c$ $c'$, substantially as and for the purpose set forth.

In testimony that I claim the foregoing as my own I affix my signature in presence of two witnesses.

CYRUS POOL.

Witnesses:
 WM. E. BELL,
 P. W. STOCKSLEGER.